United States Patent
Nayak et al.

(10) Patent No.: US 12,236,280 B2
(45) Date of Patent: Feb. 25, 2025

(54) ORCHESTRATION LAYER FOR USER DEFINED AUTOMATION WORKFLOWS

(71) Applicant: Intuit Inc., Mountain View, CA (US)

(72) Inventors: Siben Nayak, Bangalore (IN); Govinda Sambamurthy, Bangalore (IN); Nishant Sehgal, Bangalore (IN); Anil Sharma, Bangalore (IN); Srivatsan Vijayaraghavan, Bangalore (IN); Suraj Menon, Bangalore (IN); Shyamalendu Tripathy, Bangalore (IN); Jatin Mahajan, Bangalore (IN); Nivedita Nayak, Bangalore (IN); Sachin Gupta, Bangalore (IN)

(73) Assignee: Intuit Inc., Mountain View, CA (US)

( * ) Notice: Subject to any disclaimer, the term of this patent is extended or adjusted under 35 U.S.C. 154(b) by 312 days.

(21) Appl. No.: 17/223,547

(22) Filed: Apr. 6, 2021

(65) Prior Publication Data
US 2022/0318067 A1    Oct. 6, 2022

(51) Int. Cl.
| G06F 9/46 | (2006.01) |
| G06F 9/48 | (2006.01) |
| G06F 9/50 | (2006.01) |
| G06F 9/54 | (2006.01) |

(52) U.S. Cl.
CPC .......... *G06F 9/5077* (2013.01); *G06F 9/4881* (2013.01); *G06F 9/5016* (2013.01); *G06F 9/542* (2013.01); *G06F 2209/501* (2013.01)

(58) Field of Classification Search
CPC .... G06F 9/5077; G06F 9/4881; G06F 9/5016; G06F 9/542; G06F 2209/501
See application file for complete search history.

(56) References Cited

U.S. PATENT DOCUMENTS

| 10,554,817 | B1* | 2/2020 | Sullivan | H04L 41/5054 |
| 2012/0095585 | A1* | 4/2012 | Agarwal | G06Q 10/06 700/109 |
| 2013/0179208 | A1* | 7/2013 | Chung | G06Q 10/06 705/7.15 |
| 2017/0315782 | A1* | 11/2017 | Chaudhry | G06F 9/4881 |
| 2019/0236175 | A1* | 8/2019 | Cham | G06F 16/2365 |
| 2021/0034439 | A1* | 2/2021 | Vaishnav | G06F 9/38 |

FOREIGN PATENT DOCUMENTS

| CN | 105589707 B | * | 1/2019 | |
| KR | 20070084594 A | * | 8/2007 | H04L 41/5003 |

OTHER PUBLICATIONS

Gil et al, Expressive Reusable Workflow Templates, 2009, IEEE, p. 344-351. (Year: 2009).*

* cited by examiner

*Primary Examiner* — Diem K Cao
(74) *Attorney, Agent, or Firm* — DLA Piper LLP US

(57) ABSTRACT

An orchestration layer for execution user defined automation workflows. The orchestration layer may include multiple process instances that host user defined automation workflows that automate processes or tasks. To improve system performance and reduce operating costs, the user defined automation workflows are deployed to the orchestration layer in a standard format that standardizes the user defined workflow configurations. The orchestration layer may also dynamically scale the computational resources allocated to teach process instance based on the properties of each user defined automation workflow.

16 Claims, 6 Drawing Sheets

ORCHESTRATION LAYER FOR USER DEFINED AUTOMATION WORKFLOWS

BACKGROUND

Executing custom automation workflows for multiple users is inefficient and expensive. Conventional architectures can efficiently execute multiple instances of the same templated workflow, but struggle to maintain the same system performance when simultaneously executing multiple, different user defined workflows. Additionally, the number of applications that can integrate with the user defined workflows is limited by conventional automation tools. Therefore, each unique user defined workflow and application integration must be managed separately, which reduces system performance and increases operating costs. There is a need and desire to streamline execution of custom user defined automation workflows for multiple users.

DETAILED DESCRIPTION OF SEVERAL EMBODIMENTS

The disclosed technology provides a new workflow automation system that manages multiple, unique user defined workflows. The workflow automation system includes a novel orchestration layer that manages multiple process instances (i.e., individual processing increments of a server or other computer system). At runtime, each process instance receives and executes a separate user defined workflow so that multiple, unique workflows can be executed in parallel. User defined parameters and rules that adapt the workflows to user specific processes are included in a set of workflow properties. The workflow properties are converted to a standardized process definition format that is understood by each process instance included in the orchestration layer. The orchestration layer dynamically allocates computational resources to each process instance based on the workflow properties and the performance of the process instances as they execute the user defined workflows. The orchestration layer and standardized process definition format enable efficient, asynchronous execution of each unique user defined workflow generated by the workflow automation service.

The workflow properties also include application integrations. The application integrations are also standardized in the process definition format. Standardizing instructions for integrating applications with workflows enables complex interactions between each user defined workflow and a variety of applications. For example, the orchestration layer may initialize workflows based on events that occur in multiple applications or execute workflow actions by creating tasks in multiple applications. The standardized application integrations expand the number of applications that can efficiently interact with the user defined workflows.

Thus, the disclosed technology provides an orchestration layer that efficiently executes multiple unique user defined workflows. Each user defined workflow has a set of standardized workflow properties that improves the performance of the orchestration layer and expands the number of applications that can interact with each workflow. As a result, user satisfaction may be improved through improved system performance, lower operating costs, and increased customization and complexity of automation workflows. The increased user satisfaction should result in increased product engagement, positive customer ratings, and increased sales.

Figure 1:
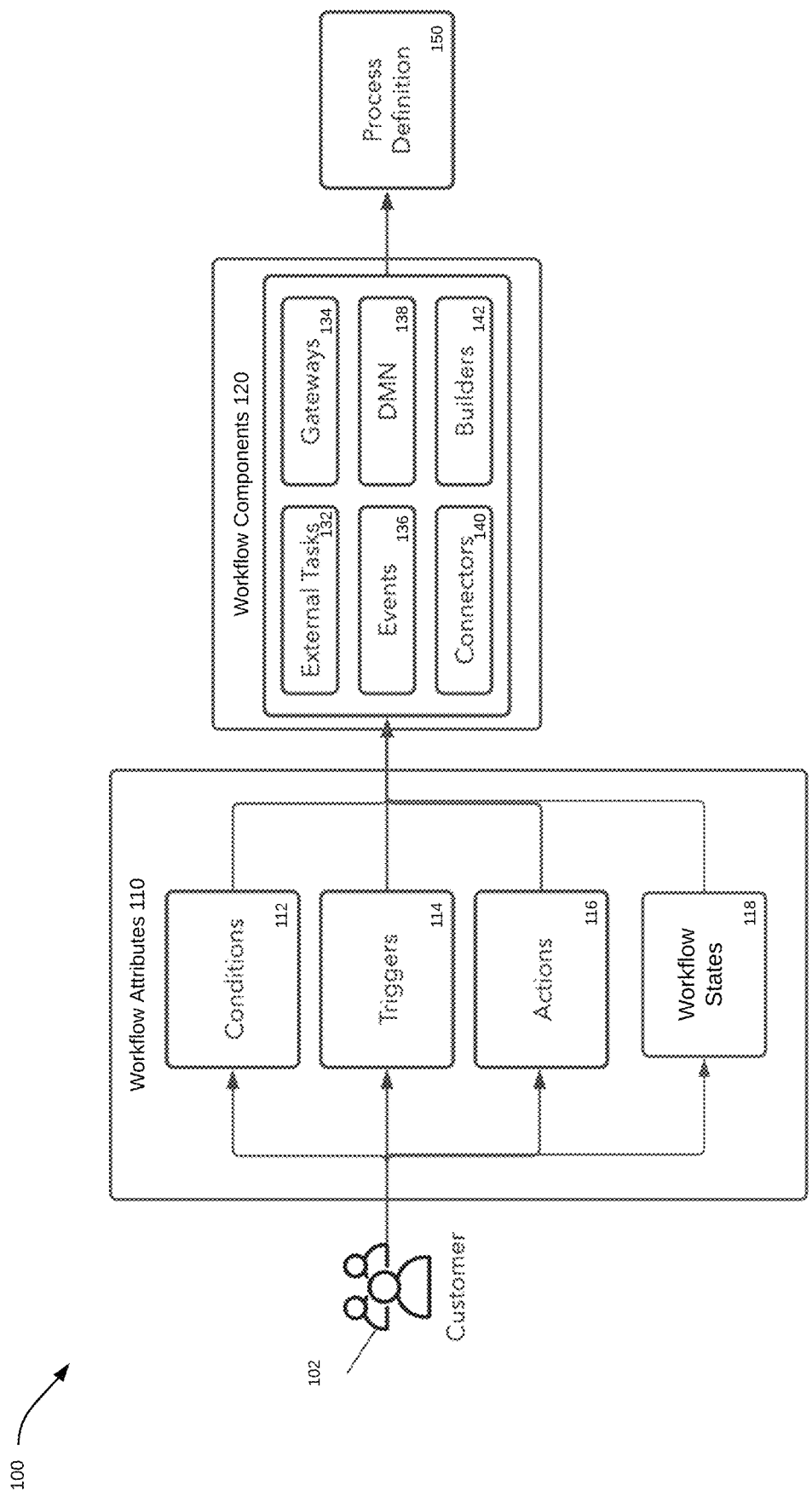
FIG. 1 shows an example process for creating user defined automation workflows according to various embodiments of the present disclosure.

FIG. 1 illustrates an exemplary process 100 for creating user defined automation workflows. The user defined automation workflows automate user specific processes. For example, the automation workflows can automate processes including approvals (e.g., requesting and performing approvals of invoices, estimates, and other documents and decisions), reminders and notifications (e.g., sending reminders for overdue tasks, follow-up messages to customers and sales leads, and other notifications), task management (e.g., creating, assigning, and managing tasks delegated to employees and third parties), data review (e.g., review notifications and tasks for data coming into company systems from external applications), automated updates (e.g., set up auto updates to in-product applications and or transaction based on conditions), onboarding of live in-product subject matter experts (e.g., educating tax and accounting subject matter experts about how to interact with users on in-product applications), engagement of live in-product subject matter experts (e.g., engaging users with tax and accounting subject matter experts based on one or more conditions), engagement of a vendor (e.g., purchasing services and or products from a third party), and the like. Each user defined automation workflow includes a plurality of workflow attributes 110 (i.e., conditions 112, triggers 114, actions 116, workflow states 118 and the like) that are customized to fit the processes and tools (i.e., systems and applications) used by each customer 102 to complete the automated processes. Customers 102 customize automation workflows by defining the workflow proprieties (e.g., rules and parameters) used to configure each automation workflow.

Each configured user defined automation workflow is integrated with one or more workflow components 120. The workflow components 120 facilitate deployment and execution of the user defined automation workflow by an orchestration layer. The workflow components 120 may be pre-configured to reduce the set-up time required to implement a new automation workflow. The workflow components 120 are also standardized for every user defined automation workflow to make the user defined automation workflows compatible with the orchestration layer. The workflow components 120 improve the performance of the orchestration layer and increase the number of applications that interface with the user defined automation workflows. Each combination of the workflow components 120 integrated with the configured user defined automation workflow is saved as a unique process definition 150 that is deployed to the orchestration layer.

The workflow components 120 may include instructions for generating external tasks 132 in one or more applications connected to the user defined automation workflows. For example, an invoice approval task in an accounting application (e.g., QuickBooks®) would be one task 132 in accordance with the disclosed technology. The external tasks 132 may be generated based on user defined triggers 114. Completing the external tasks 132 may be required to satisfy the user defined actions 116.

The workflow components 120 may also include gateways 134 and events 136. The gateways 134 may include instructions for controlling the flow through the user defined workflows based on data and events 136. For example, gateways 134 may finish a first action and initiate a second action based on a first event (i.e., receiving a piece of confirmation data confirming all tasks included in the first action are complete). Gateways 134 may also determine the correct action 116 to execute after a condition 112 is fulfilled or a trigger 114 is detected. Gateways 134 may also determine how to transition between one or more states of a user defined automation workflow. The gateways 134 may control the flow of the user defined workflow based on events 136. The user defined automation workflows may support many different types of events 136 including timing based events (i.e., events that wait on a timer condition), message based events (i.e., receiving a message or other data from an application connected to the user defined workflow), condition based events (i.e., events that wait on a condition to be satisfied), and the like. Other events 136 control the interactions between the orchestration layer and the user defined workflows. For example, start events that cause the orchestration layer to initiate a process definition 150 for a user defined workflow, end events that cause the orchestration layer to terminate a process definition 150, signal events that cause the orchestration layer to increase and or decrease the computational resources (i.e., processing power, memory, storage, and the like) allocated to a process definition, and error events that cause the orchestration layer to return an error as a result of a malfunction during the execution of a process definition (e.g., a failure to execute one or more attributes of the user defined automation workflows).

The workflow components 120 may also include ways to represent complex logic. For example, decision model notation (DMN) 138 may be used to represent decision tables, decision expressions, decision requirements graphs, and other logic models that express rules that lead to a decision as structured data that may be interpreted by the orchestration layer. The workflow components 120 may also include connectors 140 and builders 142. The connectors 140 may include instructions for integrating one or more applications with process definitions 150 for user defined automation workflows. For example, the connectors 140 may include an API for connecting an HTTP service or other web-based application with the process definitions 150 and or the user defined automation workflows included in the process definitions 150. The builders 142 may include instructions for creating a process definition 150 from the user defined workflow attributes 110 and the workflow components 120. The process definition 150 includes machine readable code that may be deployed to the orchestration layer and executed by one or more processing instances included in the orchestration layer.

Figure 2:
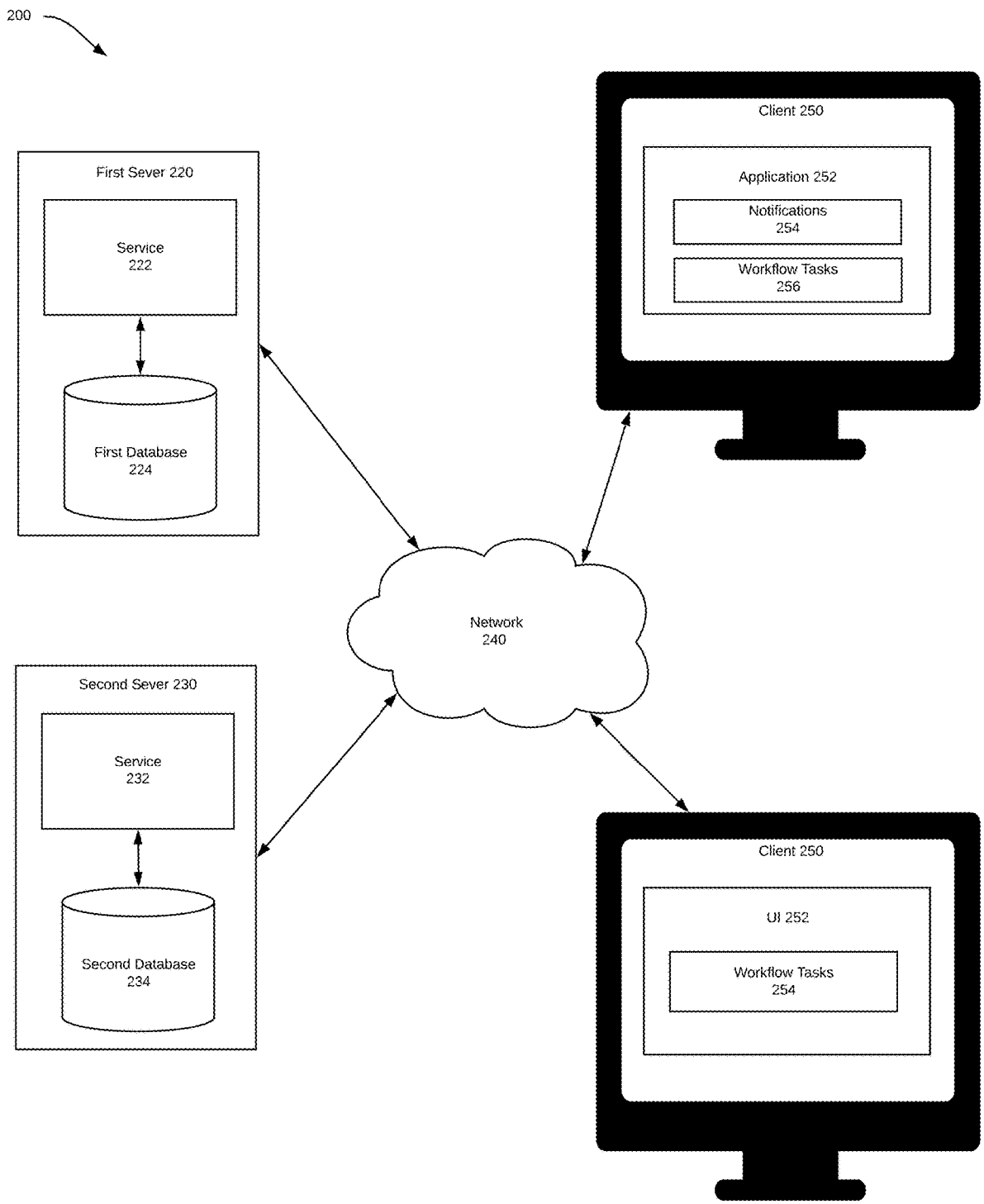
FIG. 2 illustrates an example system for executing user defined automation workflows according to various embodiments of the present disclosure.

FIG. 2 shows an example system 200 configured to implement an orchestration layer for executing user defined automated workflows in accordance with the disclosed technology. System 200 may include a first server 220, second server 230, and or one or more client devices 250. First server 220, second server 230, and or client device(s) 250 may be configured to communicate with one another through network 240. For example, communication between the elements may be facilitated by one or more application programming interfaces (APIs). APIs of system 200 may be proprietary and/or may be examples available to those of ordinary skill in the art such as Amazon® Web Services (AWS) APIs or the like. Network 240 may be the Internet and/or other public or private networks or combinations thereof.

First server 220 is configured to implement a first service 222, which in one embodiment is used to construct a user defined automation workflow that automates a process. The user defined workflows generated by the first service 222 can be in the form of a process definition that can be transmitted via network 240 to the second server 230 for execution. In accordance with the disclosed technology, the first service 222 includes a workflow automation service that may be used to build user defined automation workflows that automate company specific processes. The user defined automation workflows may integrate user defined workflow attributes with workflow templates to create custom process definitions that may be deployed to the orchestration layer. The user defined workflow attributes and the workflow templates may be received from one or more databases 124, 134, the second server 130 and or client device(s) 150.

Second server 230 is configured to implement a second service 232, which in one embodiment, is used to implement an orchestration layer used to execute process definitions generated by the first service 222. The orchestration layer receives process definitions via network 240 from one or more databases 224, 234, the second server 230 and or client device(s) 250. The second service 232 may interface with one or more of the servers 220, 230 or other servers to deploy the process definitions to process instances included in the orchestration layer. The orchestration layer uses the process instances to asynchronously execute each process definition. The number of process instances and the resources (i.e., processing power, memory allocation, storage, etc.) allocated to each processing instance are dynamically scaled to efficiently execute the process definitions. The orchestration layer improves system performance and reduces operating costs by more efficiently executing multiple process instances simultaneously.

Client device(s) 250 may be any device configured to host one or more applications 252, receive notification 254, and complete workflow tasks 256. Exemplary client devices 250 may include a personal computer, laptop computer, tablet, smartphone, or other device. The applications 252 may include any application used to complete user specific processes. For example, accounting and financial applications, customer relations management (CRM), e-commerce applications, word processing applications and the like. The process definitions cause the orchestration layer of the second service 232 to distribute notifications 254 via network 240 to applications 252 running on the client 250. The notifications 254 prompt users to complete workflow tasks 256 created in the application 252 by the orchestration layer. The workflow tasks 256 include tasks that are required to complete the user defined automation workflows included in the process definitions executed by the orchestration layer. The application 252 may include a user interface (UI) that receives input thereto. The workflow tasks 256 may be completed based on the inputs received by the UI included in the application 252.

First server 220, second server 230, first database 224, second database 234, and client device(s) 250 are each depicted as single devices for ease of illustration, but those of ordinary skill in the art will appreciate that first server 220, second server 230, first database 224, second database 234, and or client device(s) 250 may be embodied in different forms for different implementations. For example, any or each of the first server 220 and second server 230 can include a plurality of servers or one or more of the first database 224 and second database 234. Alternatively, the operations performed by any or each of first server 220 and second server 230 may be performed on fewer (e.g., one or two) servers. In another example, a plurality of client devices 250 communicate with first server 220 and/or second server 230. A single user may have multiple client devices 250, and/or there may be multiple users each having their own client device(s) 250.

Figure 3:
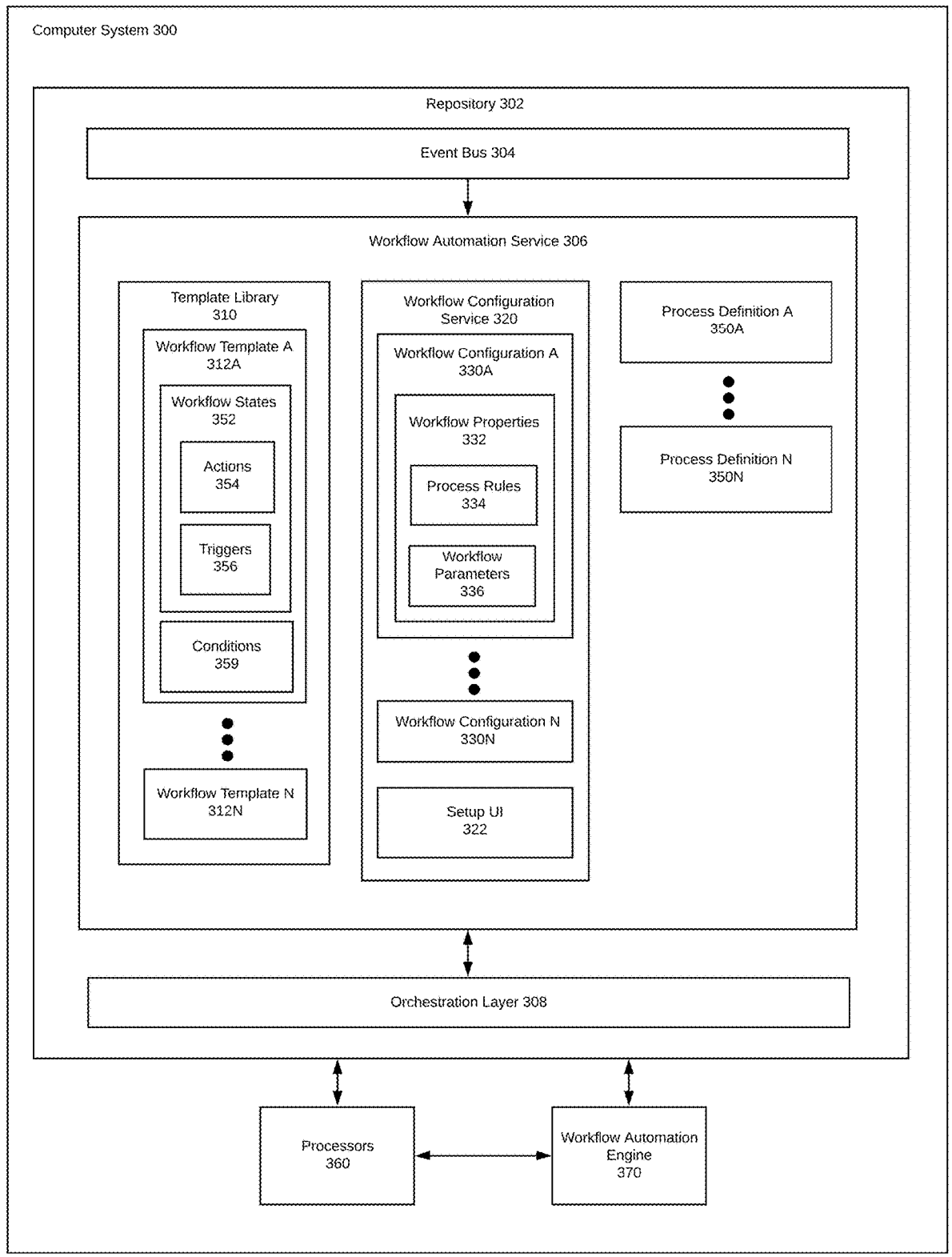
FIG. 3 shows more details of the example system shown in FIG. 2 according to various embodiments of the present disclosure.

FIG. 3 is a block diagram illustrating an example computer system 300 in accordance with one or more embodiments disclosed herein. The computer system 300 includes a repository 302, a workflow automation engine 370, and one or more computer processors 360. In one or more embodiments, the computer system 300 takes the form of the computing device 600 described in FIG. 6 and the accompanying description below or takes the form of the client device 250 described in FIG. 2. In one or more embodiments, each computer processor 360 takes the form of the computer processor 602 described with respect to FIG. 6.

In one or more embodiments, the repository 302 may be any type of storage unit and/or device (e.g., a file system, database, collection of tables, or any other storage mechanism) for storing data. Further, the repository 302 may include multiple different storage units and/or devices. In one or more embodiments, the repository 302 includes an event bus 304, a workflow automation service 306, and an orchestration layer 308.

The workflow automation service 306 generates machine readable process definitions 350A, . . . , 350N that include user defined automation workflows. The process definitions 350A, . . . , 350N may be executed by the orchestration layer 308 to complete user defined automation workflows that automate processes. For example, the user defined automation workflows can automate processes including approval processes (e.g., requesting and performing approvals of invoices, estimates, and other documents and decisions), reminder processes and other notification processes (e.g., sending reminders for overdue tasks, follow-up messages to customers and sales leads, and other notifications), task management processes (e.g., creating, assigning, and managing tasks delegated to employees and third parties), data review processes (e.g., reviewing notifications and tasks for data coming into company systems from external applications), automated update processes (e.g., setting up auto updates to in-product applications and or transaction based on conditions), onboarding processes (e.g., onboarding of live in-product subject matter experts (e.g., tax and accounting subject matter experts) to educate the experts about how to interact with users on in-product applications), engagement of live in-product subject matter experts (e.g., engaging users with tax and accounting subject matter experts based on one or more conditions), vendor engagement processes (e.g., purchasing products and or services from a third party), and the like. Each user defined automation workflow includes a plurality of attributes (i.e., workflow states 352, actions 354, triggers 356, and the like) that facilitate completing the task that corresponds to the user defined automation workflow.

The event bus 304 interfaces with one or more in-product and or external applications. The in-product applications are integrated with the event bus 304, the workflow automation service 306, and or the orchestration layer 308. For example, the in-product applications may include an accounting application (e.g., QuickBooks®). When integrated with the accounting application, the workflow automation service 306 generates process definitions including user defined automation workflows for automating accounting tasks (e.g., invoice creation, invoice approval, general ledger entry creation, general ledger entry approval, and the like). The user defined automation workflows may interact directly with the accounting applications when the process definitions are executed by the orchestration layer. For example, running the process definitions may cause the orchestration layer to generate notifications and create tasks provided by actions included in the user defined automation workflows. The orchestration layer distributes the notifications and or tasks within the accounting application to streamline completion of the process automated by the user defined automation workflows. For example, the orchestration layer may distribute a notification to a user within the accounting application. The notification may include a link to complete a task (e.g., create a general ledger entry, approve a document, generate a report, and the like) created by the automation workflow. The user may select the link to access and complete the task within the accounting application.

The external applications are standalone software products that are independent of the workflow automation service 306. The external applications are connected to the event bus 304 or orchestration layer 308 by an API or other integrations service. The external applications may include cloud databases, file management systems, and other data storage applications; customer relationship management (CRM) applications and other customer service applications; e-commerce applications, billing applications, banking applications, accounting applications and other applications that track financial transactions; word processing applications and other document generating platforms; email applications, messaging platforms calendar applications, and other communications applications; and the like. Events (e.g., entity creation, entity updates, data syncs, and other activity) that occur in the external applications are monitored by the event bus 304 and or orchestration layer 308 and may be used during execution of the process definitions. For example, an entity creation event in a CRM application (i.e., creating a new customer profile) may initialize a process definition including a user defined automation workflow for generating a bid for new work for the new customer. The workflow automation service 306 may also connect to the remote applications via an API or other integrations service. The workflow automation service 306 may migrate data from the remote applications via the API or other connection. For example, the workflow automation service 306 may configure user defined automation workflows by setting conditions and other rules based on data obtained from the remote application. The workflow automation service may also define workflow parameters (i.e., user roles and permissions, notification settings, security settings, and the like) and other workflow properties based on the data received from the remote applications.

The workflow automation service 306 includes a template library 310 having multiple workflow templates 312A, . . . , 312N. Each of the workflow templates 312A, . . . , 312N may be specific to a particular type of task. For example, distinct workflow templates 312A, . . . , 312N may exist for invoice creation and other document creation tasks, invoice approval and other hierarchical approval tasks, customer payment reminder and other reminder and notification tasks, and the like. The workflow templates 312A, . . . , 312N include pre-determined workflow attributes for each task. For example, the workflow templates 312A, . . . , 312N may include one or more pre-determined workflow states 352, actions 354, triggers 356, conditions 359, and or other workflow attributes. The pre-determined attributes may be modified by the workflow configuration service 320 to generate user defined automation workflows that may be adapted to fit a user specific process. The aspects of the workflow states 352, actions 354, triggers 356, and or conditions 359 that are not modified are pre-configured by the workflow automation service 306 to streamline implementation of user defined automation templates for automating tasks.

The workflow templates 312A, . . . , 312N are combined with workflow configurations 330A, . . . , 330N to adapt the templated automation workflows to fit user specific processes. The combination of the workflow templates 312A, . . . , 312N and workflow configurations 330A, . . . , 330N are saved as user defined automation workflows. The workflow configurations 330A, . . . , 330N are generated by a workflow configuration service 320. Each of the user defined automation workflows provides an automated process for completing a process (e.g., document creation, document approval, decision making, decision approval, and the like). The user defined automation workflows include a plurality of workflow states 352 that include one or more actions 354 and triggers 356. The workflow states 352, actions 354, triggers 356, and conditions 359 may be included in a workflow template 312A that is automatically configured. Aspects of the workflow states 352, actions 354, triggers 356, and conditions 359 may also be defined by users to generate a custom workflow that is tailored to a user specific process.

The actions 354 are subtasks that are required to complete the task of the automation workflow. Each workflow state 352 includes one or more actions 354 to break up the task automated by the workflow into multiple subtasks that systematically progress the task from start to finish as the subtasks within each workflow state 352 are completed. For example, the actions 354 included in a user defined automation workflow for generating an invoice may include monitoring an external application to detect a sales event, extracting data associated with the new sales event (e.g., customer identification (id), transaction amount, transaction date, customer contract information, and the like) from the external application, populating the extracted data into an invoice document, distributing the invoice document to one or more employees for review, receiving approval of the invoice, distributing the invoice to the customer, and booking the amount of the invoice as an accounts receivable entry.

The triggers 356 include particular events (i.e., completed actions and or tasks, started actions and or tasks, newly created data, updates to existing data, messages send, messages received, and the like) associated with the workflow states 352. Accordingly, the workflow state 352 of each of the user defined automation workflows is determined by detecting one or more triggers 356 associated with the workflow state 352. For example, the event bus 304 may detect one or more triggers 356 in an activity that occurs within one or more of the in-product and or external applications monitored by the event bus 304. For example, the creation of a new and or updated contact in a customer relationship management application may be detected as a trigger 356 that initializes a workflow model for creating a project estimate or bid document for a particular type of product or service. The sale of a product through an e-commerce application may be detected as a trigger 356 that initializes a workflow model for creating an invoice and or receipt.

Other triggers 356 may include the completion of one or more actions 356 included in a workflow state 352. For example, a confirmation indicating that a particular action 354 included in the automation workflow is in progress and or complete may be a trigger 356 that identifies that the automation workflow is currently in the workflow state 352 including the particular action 354. Additionally, receiving confirmations that all actions 354 included in a workflow state 352 may be a trigger 356 for transitioning the automation workflow to a new workflow state 352. For example, receiving a confirmation that an invoice document has been completed may be detected as a trigger 356 to transition the invoice creation workflow model from a document creation workflow state to a document approval workflow state. Receiving a confirmation that an invoice has been approved may be detected as a trigger 356 that transitions the invoice creation workflow model from a document approval workflow state to a document delivery workflow state.

Each of the automation workflows includes conditions 359. The conditions 359 include one or more characteristics that must be present for the orchestration layer 308 to initialize a process definition 350A. The conditions 359 may also include characteristics that determine when the orchestration layer 308 transitions the process definition 350A from a first workflow state to a second workflow state. The conditions 359 may include one or more characteristics of an event or other trigger 356. For example, a condition 359 for the invoice approval workflow may require the invoice amount to be above a certain amount threshold in order to initiate the invoice approval workflow. The conditions 359 may be pre-configured by the workflow automation system based on one or more default rules associated with a particular workflow model template and or corresponding conditions in an in-product or external application. For example, a condition to require approval for invoices above $1,000 in an accounting application connected to the event bus 304 may be used to set up a condition on the invoice approval workflow to initiate the workflow only when the creation of an invoice of an amount that exceeds $1,000 is received by the event bus 304.

To generate user defined automation workflows, the workflow states 352, actions 354, triggers 356, conditions 359, and other attributes of the automation workflows are customized by the user. User defined customizations to the automation workflows are included in the workflow configuration 330A. Each workflow configuration 330A includes workflow properties 332 that adapt the automation workflow to fit company and or user specific processes and or the applications and other tools currently used by the company and or user. The workflow properties 332 customize the automation workflows according to a set of user defined specifications for the automated process. The user defined specifications may be included in the process rules 334 and workflow parameters 336. For example, the workflow properties 332 include process rules 334 that assert the structure and methodology of a company or other organization into the automation workflows. For example, the process rules 334 define the attributes (i.e., the workflow states 352, actions 354, triggers 356, conditions 359, and the like) of the automation workflow based on the user specific personnel, systems, applications, and processes used to complete the automated process. The process rules 334 also determine the various paths through the workflow that may be used to complete the user specific process.

For example, the process rules 334 may define the threshold values of the conditions 359 that must be satisfied to initiate an automation workflow and or transition from one workflow state to a second workflow state. The process rules 334 may define the number of approval actions to include in an approval workflow to fit the company's approval hierarchy. The process rules 334 may also define the events (e.g., entity creation, entity removal, data sync, receiving a notification or request, sending a notification or request, and other events that occur in-product or external applications) that serve as triggers 356 for initiating the automation workflow and or transitioning between workflow states included in the automation workflow. For example, creating an invoice entity in QuickBooks® or another in-product accounting application may be used as an event that triggers executing an invoice approval custom workflow. In another example, receiving a notification indicating a user wants to talk to a live expert may be used as an event that triggers a custom workflow for finding an expert and connecting the user with the expert. The process rules 334 may also define the applications used by the company to complete the process automated by the automation workflow. The process rules 334 may determine the users assigned to complete actions 356 included in the automation workflows.

The workflow properties 332 also include workflow parameters 336 that configure the automation workflows according to the process rules 334. The workflow parameters 336 include the roles and permissions and contact information (e.g., application profile, email address, and the like) for each user assigned by the process rules 334 to complete each action 354. For example, the roles and permissions and contact information for each user assigned to complete an approval action included in an approval workflow (e.g., an invoice approval workflow). The workflow parameters 336 also include integration instructions (i.e., application end points, API query formats, configurations, and the like) for connecting the applications defined by the process rules 334 to the automation workflows. The workflow parameters 336 may configure the automation workflows to be compatible with the one or more in-product and or external applications. Integrating the automation workflows with the applications using the workflow parameters 336 allows the automation workflows to create tasks within the integrated in-product applications. The tasks created by the applications are used to complete one or more actions 354 included in the automation workflows.

Integrating the automation workflows with the applications also enables the event bus 304 and orchestration layer 308 to monitor the in-product and external applications to determine when the events (e.g., entity creation, entity removal, data sync, and the like) defined as triggers 356 by process rules 334 occur. The workflow parameters 336 may include instructions for onboarding the applications and or the workflow automation service 306 to the event bus. For example, the workflow parameters 336 may include security credentials and setup scripts for establishing a secure connection between the applications and or the orchestration layer 308 and the event bus. The application sends events (i.e., entity creation events, entity update events, data syncs, user requests, and the like) to the event bus through the secure connection between the application and the bus. The orchestration layer 308 accesses the event bus to listen to the application events that are sent to the bus. To enable the orchestration layer 308 to monitor events that occur in the applications, the event bus temporarily stores application events received from the applications in a queue. The queue enables multiple applications and multiple components within each application to simultaneously send events to the event bus. Multiple instances of the orchestration layer 308 and or multiple servers and multiple process instances included in each orchestration layer 308 can then read the queue to listen to the events. The orchestration layer 308 reads the queue to detect events that trigger initialization and or other stages of the automation workflows. Events consumed by the orchestration layer 308 are then deleted from the queue to create space for new events.

Other workflow parameters 336 adapt the automation workflows to fit user preferences and specific tools (i.e., applications and computer systems) used to complete the automated workflows. For example, the workflow parameters 336 may include user preferences to send e-mails, SMS and mobile notifications, and other messages. Workflow parameters 336 can also specify the duration between notifications as well the content of the notifications.

The workflow configuration service 320 may include a setup user interface (UI) 322 that enables users to define the process rules 334 and workflow parameters 336 included in the workflow configurations 330A, . . . , 330N. To facilitate faster configuration of the workflow parameters 336, the setup user interface (UI) 322 may auto-populate the process rules 334 and auto-configure the workflow parameters 336. The auto-populated process rules 334 may be obtained from previous user defined automation workflows generated by the user, a set of pre-defined standard workflow properties 332, and or other user defined automation workflows created by other users that automate the same or similar processes. The setup UI 322 may auto-configure the workflow parameters 336 to automatically adapt the automation workflow to the user defined process rules 334. The setup UI 322 may auto-configure the workflow parameters 336 based on the user settings or other parameters extracted from one or more applications used to complete the automated processes. For example, the setup UI 322 may auto-configure the roles and permissions of the workflow parameters 336 based on the roles and permissions and user contact information extracted from application profiles. The setup UI 322 may auto-configure the notification settings included in the workflow parameters 336 based on the notification settings extracted from user accounts on email or other messaging applications. The setup UI 322 may also auto-configure the integration instructions for one or more integrated applications included in the workflow parameters based on the integration instructions extracted from application API documentation.

Each workflow configuration 330A generated by the workflow configuration service 320 is integrated with its corresponding workflow template 312A to generate a user defined automation workflow. Each user defined automation workflow generated by the workflow automation service 306 is saved as a unique process definition 350A. The process definitions 350A, . . . , 350N are deployed to the orchestration layer 308. The orchestration layer 308 executes the process definitions 350A, . . . , 350N to run the user defined automation workflows and complete user specific processes.

Figure 4:
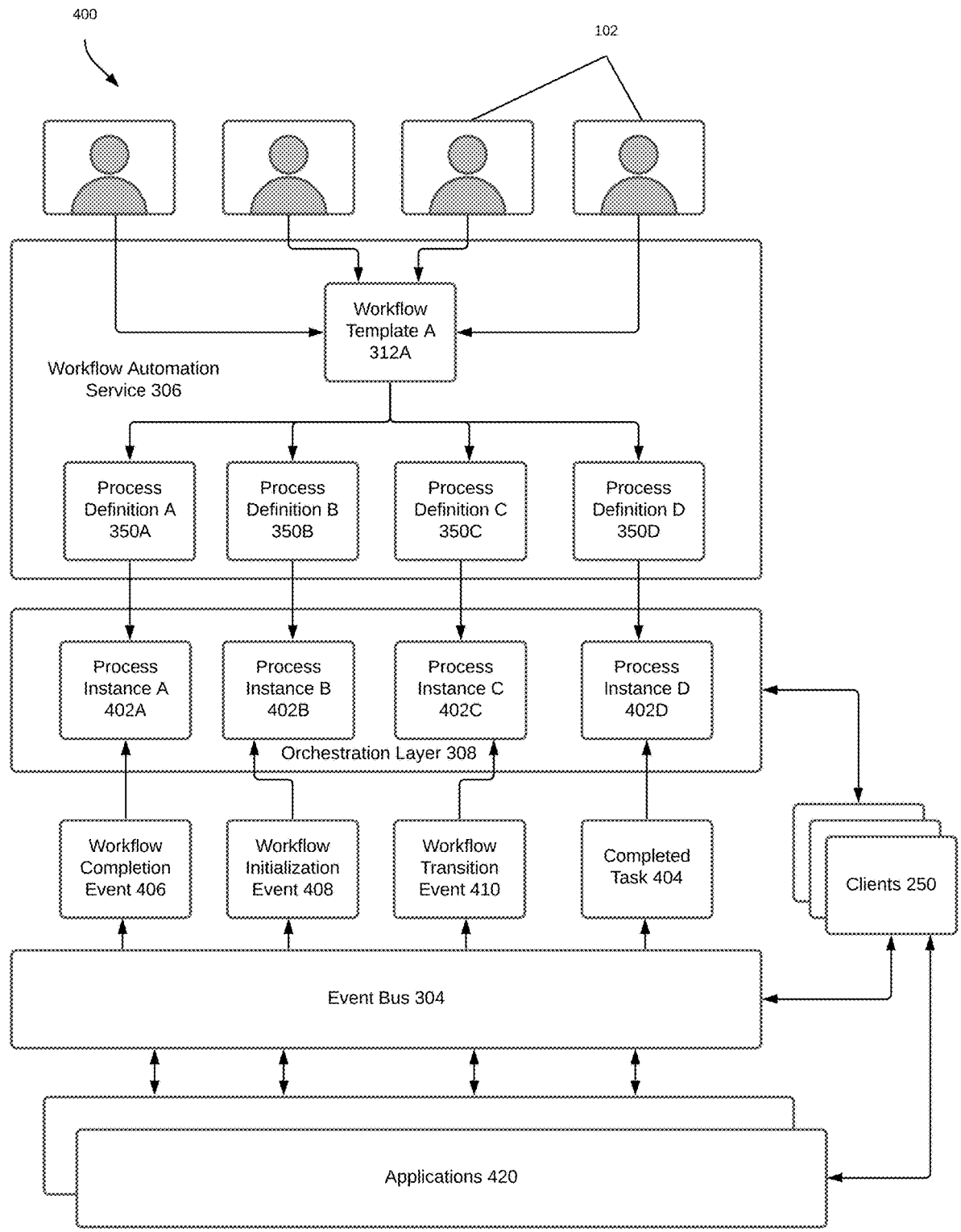
FIG. 4 shows an example system architecture for the system shown in FIG. 2 according to various embodiments of the present disclosure.

FIG. 4 illustrates more details of the workflow automation service 306, orchestration layer 308, and event bus 304 in accordance with the disclosed technology. As shown in FIG. 4, the workflow automation service 306, the orchestration layer 308, and the event bus 304 may be included in a system architecture 400 that enables simultaneous, asynchronous execution of multiple unique user defined automation workflows. As described above, customers 102 use the workflow automation service to generate user defined automation workflows. Each customer or other user may define unique workflow configurations to adapt the workflow template 312A to fit a user specific process. The customer defined workflow configurations are integrated with the workflow template 312A to generate user defined automation workflows that are saved as process definitions 350A, . . . , 350D. The process definitions 350A, . . . , 350D are deployed to the orchestration layer 308 for execution. Each process definition 350A, . . . , 350D may be deployed to a separate process instance 402A, . . . , 402D. Each process instance 402A, . . . , 402D runs the user defined automation workflows included in the process definition hosted by the process instance. For example, process instance A 402A runs the user defined automation workflow included in process definition A 350A. The user defined automation workflows included in each process definition 350A, . . . , 350D are unique. Therefore, deploying each process definition 350A, . . . , 350D to a dedicated process instance 402A ensures that the automation workflows run asynchronously without one automation workflow interfering with another automation workflow.

To run a user defined automation workflow, the process instance 402A performs an action included in the automation workflow by, for example, creating a task in an application 420 integrated with the automation workflow. The task is then distributed to a client 250 running an instance of the application 420 so that it can be completed by a user assigned to the task. The completed task 404 may be detected by the process instance 402A that generated the task. The event bus 304 also monitors applications 420 to detect completed tasks 404 and other events. Once the completed task 404 and or other events are detected, process instance 402A updates the user defined automation workflow based on the completed tasks 404 and or other event. For example, the completed task 404 (e.g., a completed invoice approval task) may cause the process instance 402D to transition to and run the next subsequent action (i.e., an invoice distribution action or other action that follows a completed invoice approval action). Other events that are detected by the event bus 304 and or process instances 402A, . . . , 402D include workflow completion events 406, workflow initialization events 408, and workflow transition events 410. For example, the workflow completion events 406 may cause the process instance 402A to determine the process is complete and terminate the user defined automation workflow. The workflow initialization events 408 may cause the process instance 402B to begin the automation workflow by running the first action. The workflow transition events 410 may cause the process instance 402C to transition the automation workflow from a first workflow state to a second workflow state. Other events that may be detected by the event bus 304 and or process instances 402A, . . . , 402D include reminder events that cause the process instance 402A to send a reminder notification to complete a task that was previously created in an application 420.

As shown in FIG. 4, the orchestration layer 308 enables asynchronous execution of multiple user defined automation workflows. For example, each process instance 402A, . . . , 402D updates the user defined automation workflows based on different completed tasks and events at different times. The multiple independent process instances 402A, . . . , 402D allow the orchestration layer to simultaneously execute multiple unique user defined automation workflows by updating each workflow in real time based on different tasks and events detected by the event bus 304 and or process instances 402A, . . . , 402D. The orchestration layer 308 may evaluate the performance of each of the process instances 402A, . . . , 402D during the execution of the user defined automation workflows. For example, the orchestration layer 308 may determine the amount of memory used, the process execution time, or other performance metrics for the process instances 402A, . . . , 402D after particular events (i.e., tasks are created, workflows are transitioned to new states, and the like) included in the automation workflows are performed.

To improve system performance, the orchestration layer 308 determines the resource allocation (i.e., the amount of computational resources (e.g., processing power, memory, storage, etc.) of the server hosting the process instances 402A, . . . , 402D) for each process instance 402A, . . . , 402D based on the performance of the multiple process instances. For example, the orchestration layer 308 may determine the resource allocation for each of the process instances 402A, . . . , 402D based on an amount of memory used by a process instance, the process execution time of the process instance, the processing resources demanded by the process instance during the execution of the automation workflow, and or other process metric of the process instance. The orchestration layer 308 modifies the computational resources allocated to the process instances 402A, . . . , 402D based on the determined resource allocation. For example, the orchestration layer 308 may allocate additional processing resources to the process instances 402A, . . . , 402D that take more than 10 seconds to perform a task creation event and or the process instances 402A, . . . , 402D that are operating at a resource allocation deficit (i.e., require an amount of memory (and or other resource) to execute an automation workflow that exceeds the current memory (and or other resource) allocated to the process instance). The orchestration layer 308 may also reduce the amount of processing resources allocated to process instances operating at a resource allocation surplus (i.e., require amount of memory (and or other resource) to execute an automation workflow that is less than the current memory (and or other resource) allocated to the process instance).

The orchestration layer 308 may also determine the resource allocation for and dynamically modify the computational resources allocated to each process instance 402A, . . . , 402D based on the tasks and events detected by the event bus 304. For example, the orchestration layer 308 may allocate additional computational resources (i.e., an amount of memory of the server or servers hosting the process instances 402A, . . . , 402D) to process instances 402A, . . . , 402D executing user defined workflows triggered by events including a large amount of data. For example, additional computational resources may be allocated to process instances 402A, . . . , 402D hosting automation workflows that are triggered by—and or involve database syncs that update thousands of entities, new entity creation events for entities storing thousands of fields or including video or other multimedia files, and the like. The orchestration layer 308 may also dynamically allocate computational resources to each process instance 402A, . . . , 402D based on the workflow attributes and workflow properties (e.g., the current workflow state and or action of the workflow, the number of tasks included in each action, the target completion time for the workflow, and the like) included in the process definitions 350A, . . . , 350D of the user defined automation workflows deployed to each process instance.

The orchestration layer 308 may also analyzes the events in the event queue, the automation workflows, and or the performance of the process instances 402A, ..., 402N executing the automation workflows to determine the resource allocation for the process instances 402A, ..., 402D and allocate computational resources based on the resource allocation. For example, the orchestration layer 308 may analyze the attributes (i.e., actions, triggers, conditions) of each automation workflow and the workflow properties that adapt the automation workflow to fit user specific processes to determine the resource allocation (i.e., amount of computational resources of the servers hosting the process instances 402A, ..., 402D to allocate each process instance) for the process instances 402A, ..., 402D. Based on the attributes and workflow properties of the automation workflows executed by the process instances 402A, ..., 402D, the performance of the process instances 402A, ..., 402D, and or the events detected by the event bus, the orchestration layer 308 determines the resource allocation for each process instance and modifies the computational resources allocated to each process instance based on the determined resource allocation. For example, the orchestration layer 308 allocates additional computational resources to process instances 402A, ..., 402D running user defined automation workflows that have many actions, complex conditions, and or a short target completion time. Conversely, the orchestration layer 308 may reduce the computational resources allocated to process instances 402A, ..., 402D running user defined automation workflows that have a limited number of actions, simple conditions, and or a longer target completion time. To determine the resource allocation (i.e., the amount of computational resources to allocate) for each process instance 402A, ..., 402N, the orchestration layer 308 may analyze each process definition 350A, ..., 350N and the performance of each process instance 402A, ..., 402N executing a process definition when the process definitions 350A, ..., 350N are first deployed to the orchestration layer 308. The orchestration layer 308 may also constantly analyze the process definitions 350A, ..., 350N and process instances 402A, ..., 402N and or analyze the process definitions 350A, ..., 350N and process instances 402A, ..., 402N at regular intervals to continuously to determine how to allocate computational resources.

The orchestration layer 308 may also dynamically modify the capacity (i.e., amount of memory, storage, processing power, and the like) and or number of the servers hosting the process instances 402A, ..., 402N based on the analysis of the event queue, automation workflows, and or the performance of the process instances 402A, ..., 402N. For example, the orchestration layer 308 may dynamically increase the capacity and or number of servers hosting the process instances 402A, ..., 402N in response to detecting a resource allocation deficit for the process instances 402A, ..., 402N (i.e., detecting the automation workflows deployed to the process instances 402A, ..., 402N that require 5 GB of working memory and the servers hosting the process instances 402A, ..., 402N only have 4 GB of working memory). The orchestration layer 308 may also dynamically reduce the capacity and or number of servers hosting the process instances 402A, ..., 402N in response to detecting a resource allocation surplus (i.e., an amount (e.g., 15% or more) of the available memory, storage, processing, or other resources of the servers is not used to execute automation workflows deployed to the process instances 402A, ..., 402N). The ability of the orchestration layer 308 to dynamically scale the capacity and or number of servers hosting the process instances 402A, ..., 402N improves the performance of the process instances 402A, ..., 402N and reduces the cost of maintaining servers and other infrastructure for executing automation workflows.

To manage simultaneous execution of many different automation workflows, the orchestration layer 308 asynchronously processes each of the process definitions 350A, ..., 350N using a separate process instance 402A, ..., 402N for each process definition 350A, ..., 350N. The process instances 402A, ..., 402N are programmed to concurrently execute each process definition 350A, ..., 350N to enable multiple automation workflows to be executed in parallel. To improve performance of the process instances 402A, ..., 402N, the state of each workflow included in a process definition 350A, ..., 350N is saved in a database not in the working memory allocated to the process instances 402A, ..., 402N. Freeing up more working memory allows the process instances 402A, ..., 402N to complete execution of each process definition 350A, ..., 350N sooner and reduces the downtime after a process instance 402A, ..., 402N completes one process definition 350A, ..., 350N and before the instance picks up another process definition to execute. If there are any errors during execution of a process definition 350A, ..., 350N, the process definition 350A, ..., 350N is picked up by another process instance 402A, ..., 402N that executes the process definition 350A, ..., 350N a predefined number of times to ensure the process definition 350A, ..., 350N is successfully completed. This system of error management increases the reliability of the orchestration layer 308 and reductions the number of errors that occur when executing the automation workflows.

Figure 5:
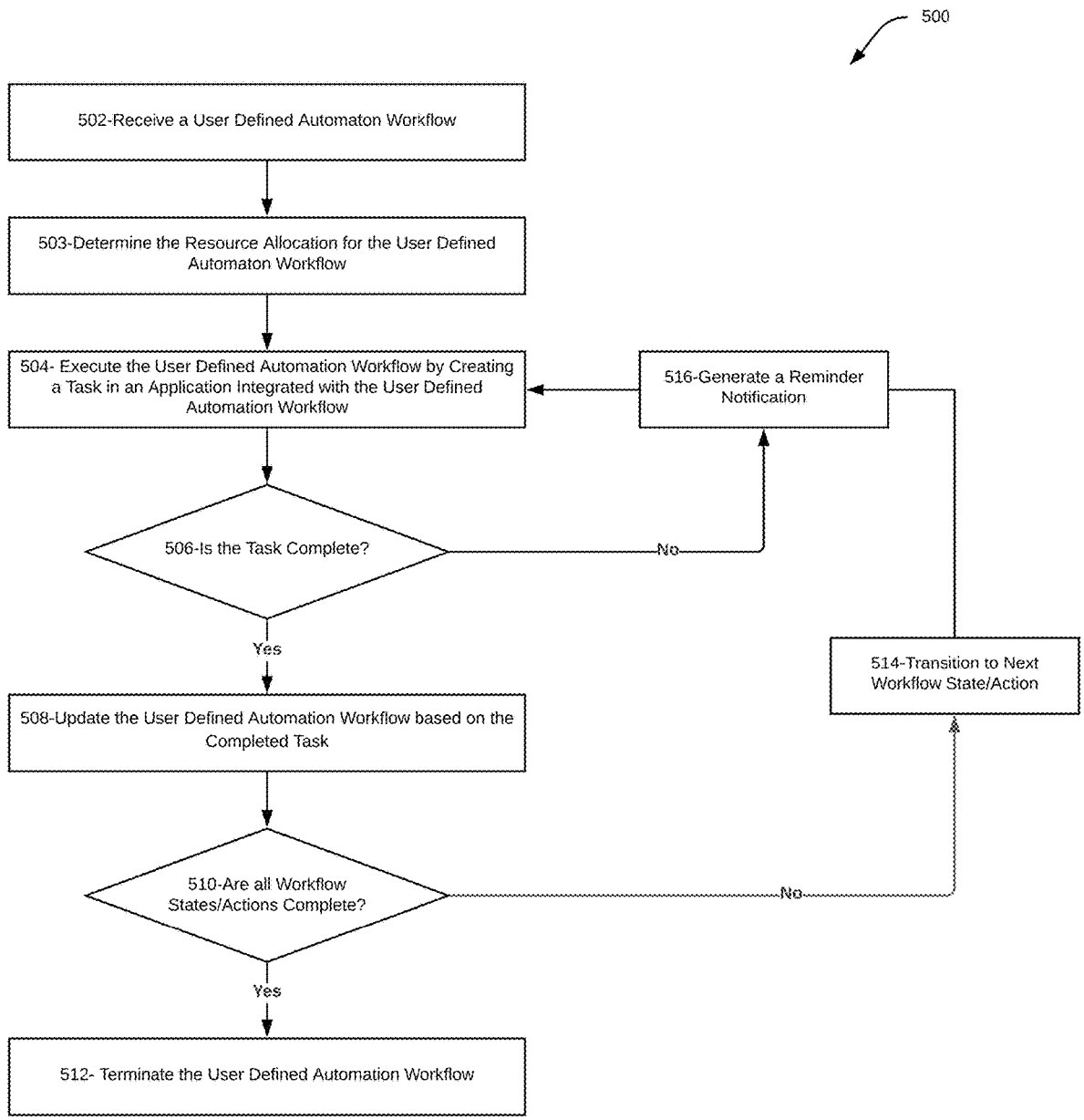
FIG. 5 is a flow diagram illustrating an example process of executing user defined automation workflows according to various embodiments of the present disclosure.

FIG. 5 illustrates an example process 500 for executing a process definition including a user defined automation workflow. At step 502 the orchestration layer receives a user defined automation workflow. As discussed above, the user defined automation workflow may be included in a process definition. To execute the user defined automation workflow, the process definition is deployed to a process instance included in the orchestration layer. At step 503, the orchestration layer analyzes the user defined automation workflow and process instance hosting the workflow to determine the resource allocation for the user defined automation workflow. For example, the orchestration layer may determine the computational resources to allocate to the process instance based on the attributes and workflow properties of the user defined automation workflow, the events triggering the user defined automation workflow, and or the performance of the process instance and or other process instances managed by the orchestration layer.

At step 504, the process instance executes the user defined automation workflow by performing the first action included in the user defined automation workflow. For example, and as shown in FIG. 5, the process instance may create a task in an application that is integrated with the user defined automation workflow. The process instance creates the task directly in the application. The process instance may also distribute a notification to the application that notifies the user assigned to complete the task that the task has been created in the application. The notification may also be distributed to an email application or other messaging application using contract information for the user assigned to complete the task.

At step 506, the process instance and or an event bus monitors the application to determine if the task has been completed. If the task is completed (i.e., a yes at step 506), the process instance updates the user defined automation workflow based on the completed task at step 508. For example, the process instance may transition the user defined automation workflow to a new workflow state and or perform a new action based on receiving the completed task. If the task is not completed (i.e., a no at step 506), the process instance may generate a reminder notification at step 516. The reminder notification may include a new instance of the task that is created by repeating step 506. The process instance distributes the reminder notification to the user within the application and or via a messaging application. The process instance and or event bus continues to monitor the application at step 508 to determine if either the task included in the reminder notification and or the original task gets completed.

At step 510, the process instance determines if all workflow states and or actions included in the user defined automation workflow are complete. If all of the workflow states and or action are complete (i.e., a yes at step 510), the process instance terminates the user defined automation workflow at step 512. Alternatively, the process instance may reset the user defined automation workflow by terminating the current instance of the workflow and opening a new instance of the user defined automation workflow. The process instance may also transition the user defined automation workflow from its final state and or action to its initial state and or action so that the user defined automation workflow may be initialized based on detecting a trigger. If the process instance determines one or more states and or action of the user defined automation workflow are not complete (i.e., no at 510), the process instance may transition the user defined automation workflow to the next workflow state and or action and repeat steps 504-510 to run the next workflow state and or perform the next workflow action. Steps 504-514 are repeated until each workflow state and or action included in the user defined automation workflow is complete and the process automated by the user defined automation workflow is done.

Figure 6:
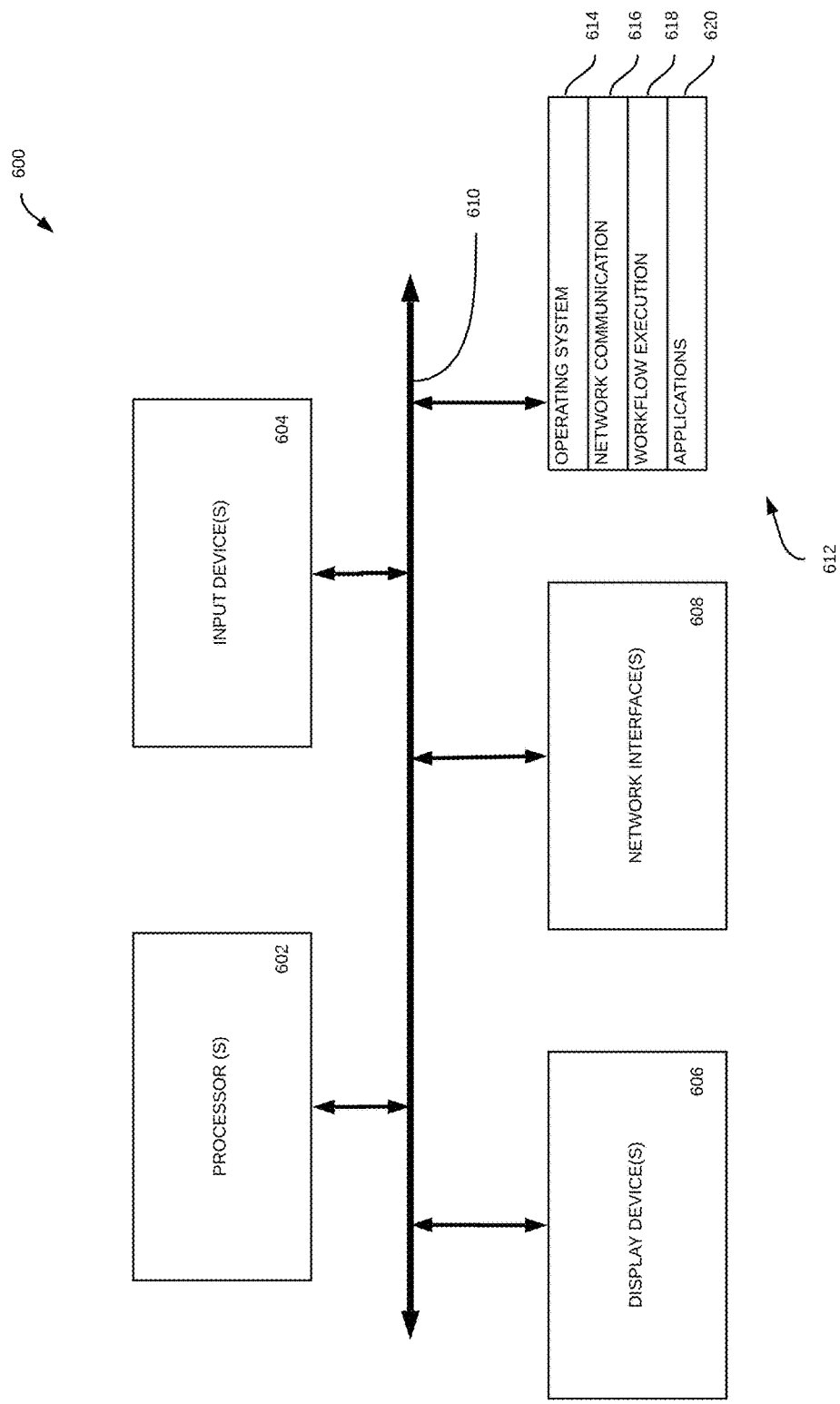
FIG. 6 is a block diagram illustrating an example computing device according to an embodiment of the present disclosure.

FIG. 6 shows an example computing device according to an embodiment of the present disclosure. For example, computing device 600 may function as client device 350, first server 320, and or second server 330. The computing device 600 may include a workflow automation platform that generates and executes user defined automation workflows as described above or a portion or combination thereof in some embodiments. The computing device 600 may be implemented on any electronic device that runs software applications derived from compiled instructions, including without limitation personal computers, servers, smart phones, media players, electronic tablets, game consoles, email devices, etc. In some implementations, the computing device 600 may include one or more processors 602, one or more input devices 604, one or more display devices 606, one or more network interfaces 608, and one or more computer-readable mediums 612. Each of these components may be coupled by bus 610, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, camera, and touch-sensitive pad or display. Bus 610 may be any known internal or external bus technology, including but not limited to ISA, EISA, PCI, PCI Express, USB, Serial ATA or FireWire. Computer-readable medium 612 may be any non-transitory medium that participates in providing instructions to processor(s) 604 for execution, including without limitation, non-volatile storage media (e.g., optical disks, magnetic disks, flash drives, etc.), or volatile media (e.g., SDRAM, ROM, etc.).

Computer-readable medium 612 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 612; controlling peripheral devices (e.g., disk drives, printers, etc.) which can be controlled directly or through an I/O controller; and managing traffic on bus 610. Network communications instructions 616 may establish and maintain network connections (e.g., software for implementing communication protocols, such as TCP/IP, HTTP, Ethernet, telephony, etc.).

Workflow execution instructions may include instructions that enable computing device 600 to function as an orchestration layer and/or to provide simultaneous, asynchronous execution of user defined automation workflows as described herein. Application(s) 620 may be an application that uses or implements the processes described herein and/or other processes. The processes may also be implemented in operating system 614. For example, application 620 and/or operating system may create tasks in applications as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks.

The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of executing user defined automation workflows, the method comprising:
receiving a first user defined automation workflow that automates a first process, the first user defined automation workflow including multiple workflow properties that customize the first user defined automation workflow;
deploying the first user defined automation workflow to an orchestration layer including multiple process instances;
creating a task within an application integrated with the first user defined automation workflow, the task corresponding to a step required to complete the first process;
extracting integration instructions from an application programming integration documentation of the application;
auto-configuring integration instructions for the application integrated with the first user defined automation workflow based on the extracted integration instructions;
evaluating a performance of one of the multiple process instances during the creation of the task; and
modifying a process instance specific resource allocation for the process instance based on the performance of the process instance and the multiple workflow properties of the first user defined automation workflow, the process instance specific resource allocation being modified based on at least one of an amount of memory used by the process instance, a process execution time of the process instance, or another performance metric of the process instance.

2. The method of claim 1, further comprising:
analyzing the first user defined automation workflow to determine a workflow attribute of the first user defined automation workflow; and
dynamically modifying a number of servers hosting the multiple process instances based on the workflow attribute.

3. The method of claim 1, further comprising:
analyzing the first user defined automation workflow to determine a workflow attribute of the first user defined automation workflow; and
determining the resource allocation for the process instance based on the workflow attribute.

4. The method of claim 1, further comprising:
receiving a second user defined automation workflow that is different from the first user defined automation workflow; and
deploying the second user defined automation workflow to a second process instance included in the multiple process instances, wherein the second process instance is different from the process instance.

5. The method of claim 1, further comprising:
detecting an event in the application; and
updating the first user defined automation workflow based on the event.

6. The method of claim 1, wherein the first user defined automation workflow is created by combining a workflow template with a workflow configuration, the workflow configuration including the multiple workflow properties that customize the first user defined automation workflow.

7. The method of claim 6, wherein the workflow template includes pre-determined workflow attributes that are required to complete the first process, and
the method further comprises modifying one or more of the pre-determined workflow attributes to create a custom workflow.

8. The method of claim 1, wherein the first process includes at least one of an approval process, a reminder process, a task management process, a data review process, an automated update process, an onboarding process, or a vendor engagement process.

9. A system for executing user defined automation workflows, said system comprising:
a repository configured to store multiple user defined automation workflows that automate multiple processes; and
an orchestration layer including multiple process instances, the orchestration layer executing on a processor and being configured to:
receive a first user defined automation workflow that automates a first process, the first user defined automation workflow including multiple workflow properties that customize the first user defined automation workflow;
deploy the first user defined automation workflow to a process instance included in the multiple process instances;
create a task within an application integrated with the first user defined automation workflow, the task corresponding to a step required to complete the first process;
extract integration instructions from an application programming integration documentation of the application;
auto-configure integration instructions for the application integrated with the first user defined automation workflow based on the extracted integration instructions;
evaluate a performance of the process instance during the creation of the task; and
modify a process instance specific resource allocation for the process instance based on the performance of the process instance and the multiple workflow properties of the first user defined automation workflow, the process instance specific resource allocation being modified based on at least one of an amount of memory used by the process instance, a process execution time of the process instance, or another performance metric of the process instance.

10. The system of claim 9, wherein the orchestration layer is further configured to analyze the first user defined automation workflow to determine a workflow attribute of the first user defined automation workflow; and
dynamically modify a number of servers hosting the multiple process instances based on the workflow attribute.

11. The system of claim 9, wherein the orchestration layer is further configured to analyze the first user defined automation workflow to determine a workflow attribute of the first user defined automation workflow; and
determine the resource allocation for the process instance based on the workflow attribute.

12. The system of claim 9, wherein the orchestration layer is further configured to receive a second user defined automation workflow that is different from the first user defined automation workflow; and
deploy the second user defined automation workflow to a second process instance included in the multiple process instances, wherein the second process instance is different from the process instance hosting the first user defined automation workflow.

13. The system of claim 9, wherein the orchestration layer is further configured to detect an event in the application; and
update the first user defined automation workflow based on the event.

14. The system of claim 9, wherein the first user defined automation workflow is created by combining a workflow template with a workflow configuration, the workflow configuration including the multiple workflow properties that customize the first user defined automation workflow.

15. The system of claim 14, wherein the workflow template includes pre-determined workflow attributes that are required to complete the first process, and
the orchestration layer is further configured to modify one or more of the pre-determined workflow attributes to create a custom workflow.

16. The system of claim 9, wherein the first process includes at least one of an approval process, a reminder process, a task management process, a data review process, automated update process, an onboarding process, or a vendor engagement process.

* * * * *